(12) United States Patent
Goitsuka

(10) Patent No.: US 12,308,457 B2
(45) Date of Patent: May 20, 2025

(54) POWER STORAGE DEVICE

(71) Applicant: TOYOTA JIDOSHA KABUSHIKI KAISHA, Toyota (JP)

(72) Inventor: Shinya Goitsuka, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 553 days.

(21) Appl. No.: 17/861,631

(22) Filed: Jul. 11, 2022

(65) Prior Publication Data

US 2023/0020890 A1 Jan. 19, 2023

(30) Foreign Application Priority Data

Jul. 13, 2021 (JP) .................................. 2021-115662

(51) Int. Cl.
- *H01M 50/262* (2021.01)
- *H01M 10/48* (2006.01)
- *H01M 50/209* (2021.01)

(52) U.S. Cl.
CPC ....... *H01M 50/262* (2021.01); *H01M 10/482* (2013.01); *H01M 50/209* (2021.01); *H01M 2220/20* (2013.01)

(58) Field of Classification Search
CPC .................................................. H01M 10/482
See application file for complete search history.

(56) References Cited

U.S. PATENT DOCUMENTS

2021/0218074 A1* 7/2021 Aoki ................. H01M 10/4257

FOREIGN PATENT DOCUMENTS

| JP | 2014203741 A | * 10/2014 | ............ Y02E 60/10 |
| JP | 2016143584 A | 8/2016 | |

\* cited by examiner

*Primary Examiner* — Christopher P Domone
*Assistant Examiner* — Julia Marie Fehr
(74) *Attorney, Agent, or Firm* — Dinsmore & Shohl LLP

(57) ABSTRACT

A power storage device includes a plurality of power storage modules, a case, a monitoring unit, and an attachment bracket. Each of the power storage modules includes a plurality of power storage cells. The power storage modules are arranged side by side in an orthogonal direction. The monitoring unit is disposed between the case and the power storage modules. The monitoring unit includes a housing made of resin. The case includes a partition wall made of metal and an outer-side covering portion made of metal. The partition wall includes a lateral-side covering portion. The attachment bracket includes an upper-side covering portion that covers an upper side of the monitoring unit.

5 Claims, 4 Drawing Sheets

POWER STORAGE DEVICE

This nonprovisional application is based on Japanese Patent Application No. 2021-115662 filed on Jul. 13, 2021 with the Japan Patent Office, the entire contents of which are hereby incorporated by reference.

BACKGROUND

Field

The present disclosure relates to a power storage device.

Description of the Background Art

Conventionally, a battery pack mounted on a vehicle or the like has been known. For example, Japanese Patent Laying-Open No. 2016-143584 discloses a battery monitoring module including: assembled batteries in which a plurality of battery cells are arranged; and a bus bar module that electrically connects the assembled batteries in series for monitoring a voltage on each battery cell. The bus bar module includes a monitoring unit that includes: a printed circuit board on which a monitoring IC for monitoring the status conditions such as a voltage and a temperature of each battery cell is disposed; and a monitoring unit case that accommodates the printed circuit board.

SUMMARY

In the battery monitoring module as disclosed in Japanese Patent Laying-Open No. 2016-143584, it is desirable that the monitoring unit has high anti-noise performance. For this purpose, it is conceivable to add a dedicated shield member made of iron or the like, to form the monitoring unit case from metal, and the like. This however may increase cost and weight.

An object of the present disclosure is to provide a power storage device capable of enhancing anti-noise performance of a monitoring unit while avoiding an increase in weight of the monitoring unit.

A power storage device according to an aspect of the present disclosure includes: a plurality of power storage modules; a case that accommodates the power storage modules; a monitoring unit that is disposed inside the case and monitors the power storage modules; and an attachment bracket that is made of metal and serves to attach the power storage modules to the case. Each of the power storage modules includes a plurality of power storage cells arranged side by side in one direction. The power storage modules are arranged side by side in an orthogonal direction orthogonal to both the one direction and an upward/downward direction. The monitoring unit is disposed between the case and the power storage modules in the one direction. The monitoring unit includes a housing made of resin. The case includes: a partition wall that is made of metal and provides a partition between a pair of power storage modules adjacent to each other in the orthogonal direction; and an outer-side covering portion that is made of metal and covers an outer side of the monitoring unit in the one direction. The partition wall includes a lateral-side covering portion that covers a lateral side of the monitoring unit in the orthogonal direction. The attachment bracket includes an upper-side covering portion that covers an upper side of the monitoring unit.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Figure 1:
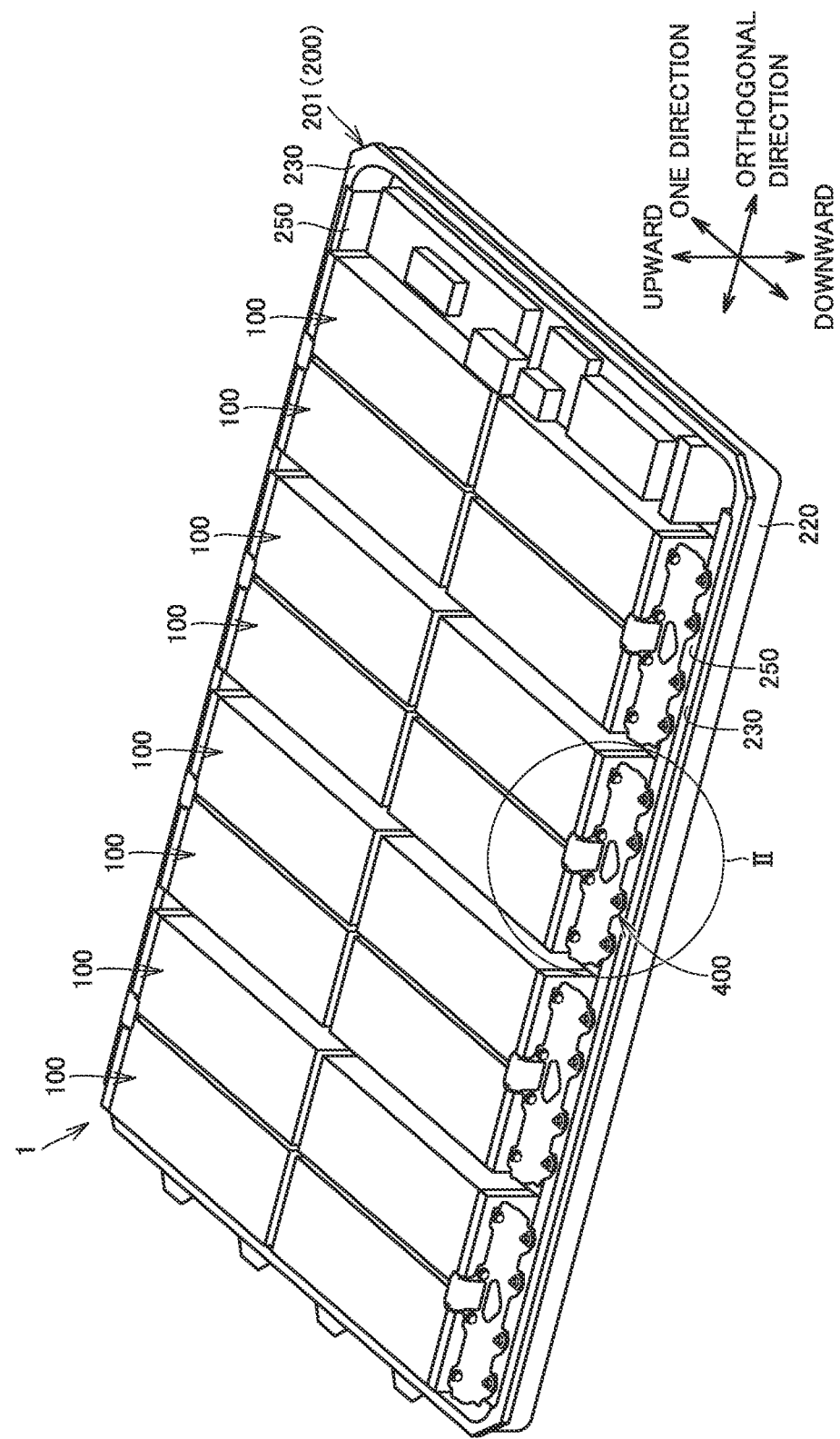
FIG. 1 is a perspective view schematically showing a configuration of a power storage device according to one embodiment of the present disclosure.

Embodiments of the present disclosure will be hereinafter described with reference to the accompanying drawings, in which the same or corresponding members are denoted by the same reference numerals.

FIG. 1 is a perspective view schematically showing a configuration of a power storage device according to one embodiment of the present disclosure. A power storage device 1 is mounted on a vehicle, for example.

As shown in FIGS. 1 to 4, power storage device 1 includes a plurality of power storage modules 100, a case 200, a monitoring unit 300, and an attachment bracket 400.

Figure 2:
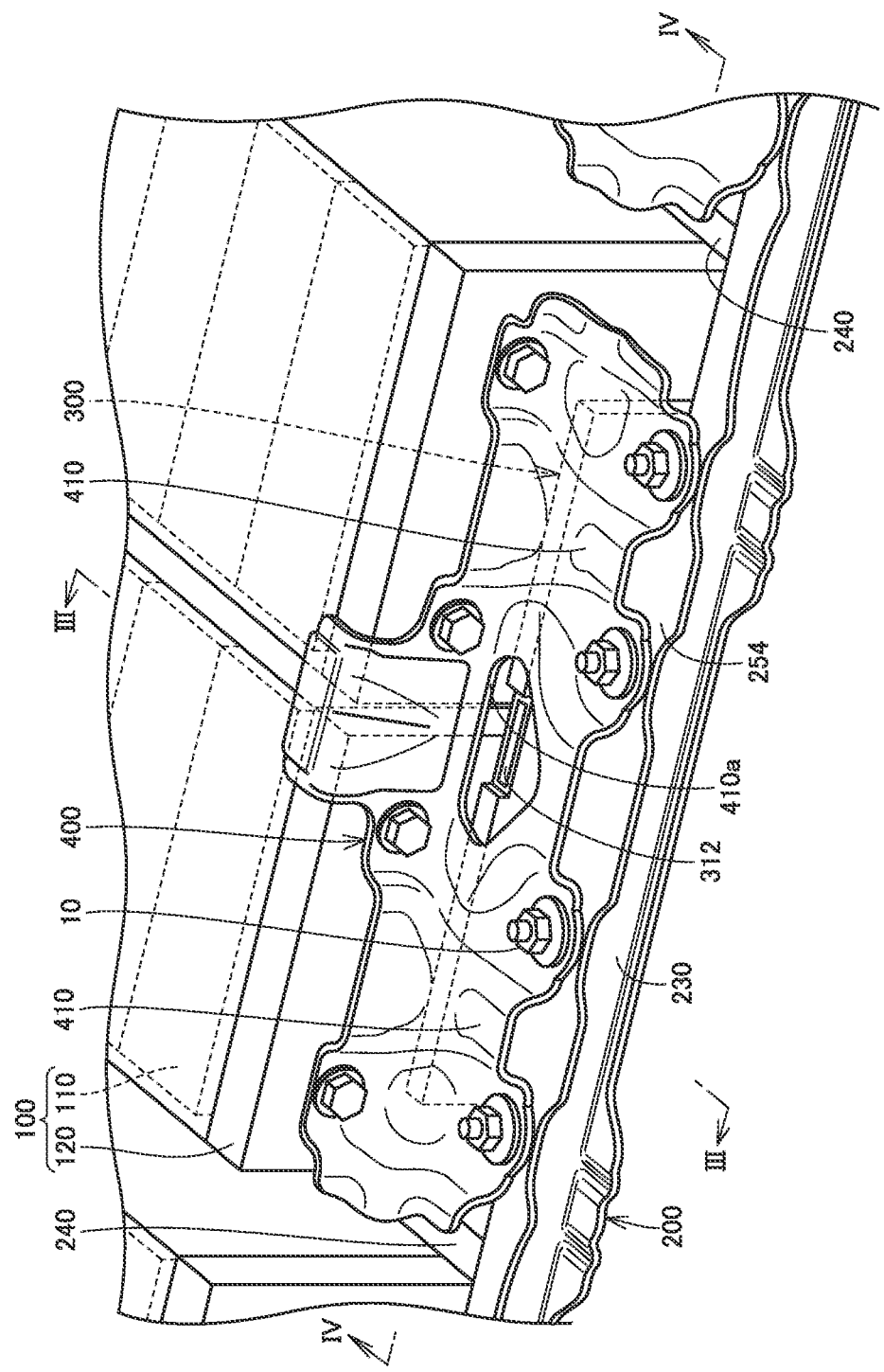
FIG. 2 is an enlarged view of a portion indicated by a solid line II in FIG. 1.

As shown in FIG. 2, each power storage module 100 includes a plurality of power storage cells 110 and a pair of end plates 120.

The plurality of power storage cells 110 are arranged side by side in one direction. Examples of power storage cell 110 include a lithium ion battery. Each power storage cell 110 is formed in a rectangular parallelepiped shape. As shown in FIG. 1, the plurality of power storage modules 100 are arranged side by side in an orthogonal direction orthogonal to both the above-mentioned one direction and an upward/downward direction.

The pair of end plates 120 are disposed on both sides of the plurality of power storage cells 110 in the one direction. Each end plate 120 is made of metal (aluminum or the like).

Case 200 accommodates the plurality of power storage modules 100. Case 200 includes a lower case 201 and an upper case 202 (see FIG. 3). FIGS. 1 and 2 each do not show upper case 202.

Lower case 201 is shaped to open upward. Lower case 201 is made of metal. Lower case 201 includes a bottom wall 210, a circumferential wall 220, a flange 230, a partition wall 240, and a reinforcing bracket 250.

Figure 3:
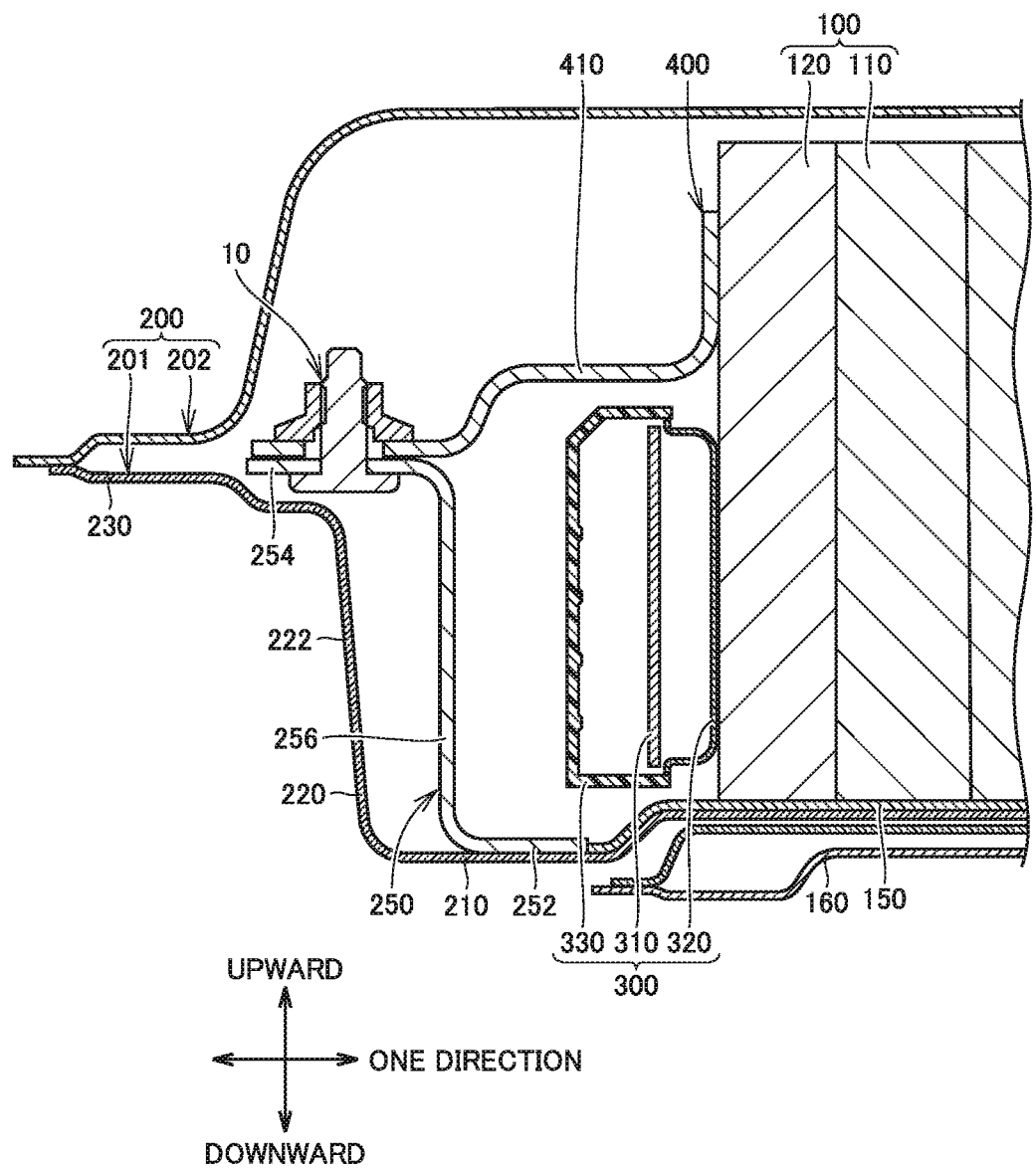
FIG. 3 is a cross-sectional view taken along a line III-III in FIG. 2.

Bottom wall 210 is disposed below the plurality of power storage modules 100. As shown in FIG. 3, a thermally conductive layer 150 is provided between bottom wall 210 and power storage module 100. A cooler 160 is provided below bottom wall 210.

Circumferential wall 220 is provided upright from the circumferential edge of bottom wall 210 and surrounds the plurality of power storage modules 100.

Flange 230 is shaped to protrude outward from an upper end portion of circumferential wall 220.

Figure 4:
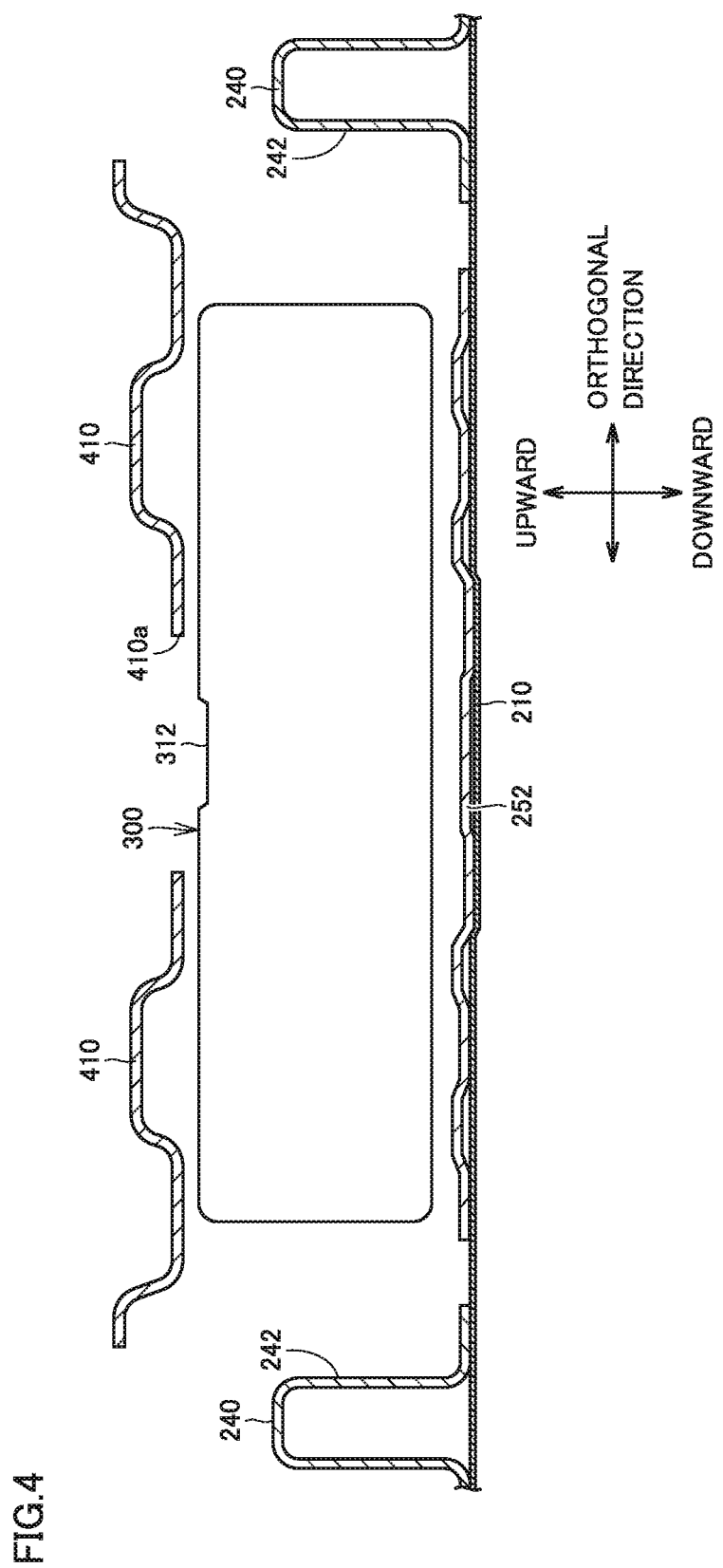
FIG. 4 is a cross-sectional view taken along a line IV-IV in FIG. 2.

As shown in FIGS. 2 and 4, partition wall 240 provides a partition between a pair of power storage modules 100 adjacent to each other in the orthogonal direction. Both ends of partition wall 240 in the one direction are connected to circumferential wall 220. In other words, partition wall 240 has a function of reinforcing circumferential wall 220.

Reinforcing bracket 250 is disposed between circumferential wall 220 and power storage modules 100 in the one direction. Reinforcing bracket 250 reinforces the attachment of power storage module 100 to bottom wall 210 or circumferential wall 220. In the present embodiment, reinforcing bracket 250 reinforces the attachment of power storage module 100 to bottom wall 210. Reinforcing bracket 250 includes a lower-side fixing portion 252, an upper-side fixing portion 254, and an interposing portion 256.

As shown in FIG. 3, lower-side fixing portion 252 is fixed to an inner surface of bottom wall 210 by welding or the like. Lower-side fixing portion 252 is formed in a flat plate shape.

As shown in FIG. 2, upper-side fixing portion 254 is fixed to flange 230 by welding or the like. Upper-side fixing portion 254 is formed in a flat plate shape.

Interposing portion 256 couples lower-side fixing portion 252 and upper-side fixing portion 254. Interposing portion 256 is formed in a flat plate shape. Interposing portion 256 is disposed between circumferential wall 220 and power storage module 100 in the one direction.

As shown in FIG. 3, upper case 202 is shaped to open downward. Together with lower case 201, upper case 202 accommodates the plurality of power storage modules 100. Upper case 202 is made of metal.

Monitoring unit 300 monitors the plurality of power storage modules 100. Monitoring unit 300 is disposed inside case 200. As shown in FIGS. 2 and 3, monitoring unit 300 is disposed between power storage module 100 and circumferential wall 220 in the one direction, more specifically, between end plate 120 and reinforcing bracket 250 in the one direction. Monitoring unit 300 includes a main body 310, a holder 320, and a housing 330.

Main body 310 includes a substrate on which elements for monitoring the voltage, the temperature, and the like of each power storage cell 110 are mounted. As shown in FIGS. 2 and 4, a connector 312 is provided in an upper portion of main body 310.

Holder 320 holds main body 310. Holder 320 is made of metal (iron or the like). Holder 320 is fixed to end plate 120.

Together with holder 320, housing 330 accommodates main body 310. As shown in FIG. 2, an upper portion of housing 330 is provided with an exposure port through which connector 312 is exposed. Housing 330 is made of resin.

Attachment bracket 400 serves as a bracket for attaching the plurality of power storage modules 100 to case 200. Attachment bracket 400 is made of metal (iron or the like). As shown in FIGS. 2 and 3, attachment bracket 400 is fixed to each power storage module 100 and upper-side fixing portion 254 by a fastening member (a bolt or the like) 10.

Attachment bracket 400 includes an upper-side covering portion 410 that covers the upper side of monitoring unit 300. As shown in FIG. 4, upper-side covering portion 410 is longer in the orthogonal direction than monitoring unit 300. As shown in FIGS. 2 and 4, an opening 410a sized to allow access to connector 312 is provided in a portion of upper-side covering portion 410 that is located above connector 312.

The following describes a portion of lower case 201 that is located in the vicinity of monitoring unit 300. As shown in FIG. 3, circumferential wall 220 has a facing portion 222 that faces reinforcing bracket 250 in the one direction. Facing portion 222 is located outside monitoring unit 300 in the one direction. Interposing portion 256 is interposed between monitoring unit 300 and facing portion 222. In other words, interposing portion 256 is also located outside monitoring unit 300 in the one direction. Facing portion 222 and interposing portion 256 of reinforcing bracket 250 each are made of metal, and constitute an outer-side covering portion that covers the outer side of monitoring unit 300 in the one direction.

As shown in FIG. 4, partition wall 240 includes a lateral-side covering portion 242 that covers the lateral side of monitoring unit 300 in the orthogonal direction.

As described above, in power storage device 1 of the present embodiment, monitoring unit 300 is surrounded and covered by lateral-side covering portion 242, outer-side covering portion (facing portion 222 and interposing portion 256), and upper-side covering portion 410 (these portions each are made of metal), so that monitoring unit 300 is effectively shielded. In this case, lateral-side covering portion 242 and the outer-side covering portion are formed of a part of case 200, and upper-side covering portion 410 is formed of a part of attachment bracket 400. Thus, as compared with the case where a shield member dedicated to shielding of monitoring unit 300 is used or the case where housing 330 of monitoring unit 300 is made of metal such as iron, the anti-noise performance of monitoring unit 300 can be enhanced while reducing the weight and cost of monitoring unit 300 by forming housing 330 from resin.

Further, end plate 120 and holder 320 serves to effectively block the noise directed toward main body 310 of monitoring unit 300 from the side where each power storage cell 110 is located with respect to main body 310.

In the above-described embodiment, only one of facing portion 222 and interposing portion 256 may constitute the outer-side covering portion. In other words, one of facing portion 222 and interposing portion 256 may be made of resin in place of metal.

Further, reinforcing bracket 250 may not be provided. In this case, only facing portion 222 made of metal constitutes the outer-side covering portion, and attachment bracket 400 is fixed to flange 230 or the like of lower case 201.

It will be appreciated by those skilled in the art that the above-described illustrative embodiments are specific examples of the following aspects.

A power storage device in the above-described embodiment includes: a plurality of power storage modules; a case that accommodates the power storage modules; a monitoring unit that is disposed inside the case and monitors the power storage modules; and an attachment bracket that is made of metal and serves to attach the power storage modules to the case. Each of the power storage modules includes a plurality of power storage cells arranged side by side in one direction. The power storage modules are arranged side by side in an orthogonal direction orthogonal to both the one direction and an upward/downward direction. The monitoring unit is disposed between the case and the power storage modules in the one direction. The monitoring unit includes a housing made of resin. The case includes: a partition wall that is made of metal and provides a partition between a pair of power storage modules adjacent to each other in the orthogonal direction; and an outer-side covering portion that is made of metal and covers an outer side of the monitoring unit in the one direction. The partition wall includes a lateral-side covering portion that covers a lateral side of the monitoring unit in the orthogonal direction. The attachment bracket includes an upper-side covering portion that covers an upper side of the monitoring unit.

In the present power storage device, the monitoring unit is surrounded and covered by the lateral-side covering portion, the outer-side covering portion, and the upper-side covering portion that each are made of metal, so that the monitoring unit is effectively shielded. In this case, the lateral-side covering portion and the outer-side covering portion are formed of a part of the case, and the upper-side covering portion is formed of a part of the attachment bracket. Accordingly, as compared with the case where a shield member dedicated to shielding of the monitoring unit is used or the case where the housing of the monitoring unit is made of metal such as iron, the anti-noise performance of the monitoring unit can be enhanced while avoiding an increase in weight of the monitoring unit by forming the housing from resin.

In some embodiments, the upper-side covering portion is longer in the orthogonal direction than the monitoring unit.

In the above-described configuration, the noise directed from above the monitoring unit toward the monitoring unit is more effectively blocked by the upper-side covering portion.

In some embodiments, the case includes: a bottom wall disposed below the power storage modules; a circumferential wall that is provided upright from a circumferential edge of the bottom wall and surrounds the power storage modules; and a reinforcing bracket that is disposed between the circumferential wall and the monitoring unit to reinforce attachment of each of the power storage modules to the bottom wall or the circumferential wall, the circumferential wall has a facing portion that faces the reinforcing bracket in the one direction, and at least one of the facing portion and the reinforcing bracket constitutes the outer-side covering portion.

In some embodiments, the circumferential wall and the reinforcing bracket each are made of metal, and the facing portion and the reinforcing bracket constitute the outer-side covering portion.

In the present aspect, the noise directed from outside the monitoring unit toward the monitoring unit in the one direction is more reliably shielded.

In some embodiments, the case further includes a flange that protrudes outward from an upper end portion of the circumferential wall, the reinforcing bracket includes: a lower-side fixing portion that is fixed to the bottom wall; an upper-side fixing portion that is fixed to the flange; and an interposing portion that couples the lower-side fixing portion and the upper-side fixing portion and is interposed between the monitoring unit and the facing portion, and the attachment bracket is fixed to each of the power storage modules and the upper-side fixing portion.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A power storage device comprising:
   a plurality of power storage modules;
   a case that accommodates the power storage modules;
   a monitoring unit that is disposed inside the case and monitors the power storage modules; and
   an attachment bracket that is made of metal and serves to attach the power storage modules to the case, wherein
   each of the power storage modules includes a plurality of power storage cells arranged side by side in one direction,
   the power storage modules are arranged side by side in an orthogonal direction orthogonal to both the one direction and an upward/downward direction,
   the monitoring unit is disposed between the case and the power storage modules in the one direction,
   the monitoring unit includes a housing made of resin,
   the case includes
      a partition wall that is made of metal and provides a partition between a pair of power storage modules adjacent to each other in the orthogonal direction, and
      an outer-side covering portion that is made of metal and covers an outer side of the monitoring unit in the one direction,
   the partition wall includes a lateral-side covering portion that covers a lateral side of the monitoring unit in the orthogonal direction, and
   the attachment bracket includes an upper-side covering portion that covers an upper side of the monitoring unit.

2. The power storage device according to claim 1, wherein the upper-side covering portion is longer in the orthogonal direction than the monitoring unit.

3. The power storage device according to claim 1, wherein the case includes
   a bottom wall that is disposed below the power storage modules,
   a circumferential wall that is provided upright from a circumferential edge of the bottom wall and surrounds the power storage modules, and
   a reinforcing bracket that is disposed between the circumferential wall and the monitoring unit, and reinforces attachment of each of the power storage modules to the bottom wall or the circumferential wall,
   the circumferential wall has an facing portion that faces the reinforcing bracket in the one direction, and
   at least one of the facing portion and the reinforcing bracket constitutes the outer-side covering portion.

4. The power storage device according to claim 3, wherein the circumferential wall and the reinforcing bracket each are made of metal, and
   the facing portion and the reinforcing bracket constitute the outer-side covering portion.

5. The power storage device according to claim 3, wherein the case further includes a flange that protrudes outward from an upper end portion of the circumferential wall,
   the reinforcing bracket includes
      a lower-side fixing portion that is fixed to the bottom wall,
      an upper-side fixing portion that is fixed to the flange, and
      an interposing portion that couples the lower-side fixing portion and the upper-side fixing portion and is interposed between the monitoring unit and the facing portion, and
   the attachment bracket is fixed to each of the power storage modules and the upper-side fixing portion.

* * * * *